United States Patent
Gunti et al.

(10) Patent No.: US 9,311,475 B2
(45) Date of Patent: Apr. 12, 2016

(54) TRUSTED EXECUTION OF BINARIES AND MODULES

(71) Applicant: VMware, Inc., Palo Alto, CA (US)

(72) Inventors: Mukund Gunti, Sunnyvale, CA (US); Christoph Klee, Issaquah, WA (US)

(73) Assignee: VMware, Inc., Palo Alto, CA (US)

( * ) Notice: Subject to any disclaimer, the term of this patent is extended or adjusted under 35 U.S.C. 154(b) by 124 days.

(21) Appl. No.: 14/297,044

(22) Filed: Jun. 5, 2014

(65) Prior Publication Data

US 2015/0067838 A1    Mar. 5, 2015

Related U.S. Application Data

(60) Provisional application No. 61/872,458, filed on Aug. 30, 2013.

(51) Int. Cl.
  *G06F 9/00* (2006.01)
  *G06F 21/51* (2013.01)
  *G06F 21/57* (2013.01)

(52) U.S. Cl.
  CPC .............. *G06F 21/51* (2013.01); *G06F 21/57* (2013.01)

(58) Field of Classification Search
  CPC .................................. H04L 67/10; G06F 9/00
  USPC ............................................................ 726/22
  See application file for complete search history.

(56) References Cited

U.S. PATENT DOCUMENTS

| | | | | |
|---|---|---|---|---|
| 8,245,227 | B2 * | 8/2012 | Devine | G06F 12/1009 711/202 |
| 8,694,763 | B2 * | 4/2014 | Thorsen | G06F 21/575 713/1 |
| 2007/0106986 | A1 * | 5/2007 | Worley | G06F 9/45537 718/1 |
| 2008/0082772 | A1 * | 4/2008 | Savagaonkar | G06F 12/145 711/163 |
| 2010/0031360 | A1 * | 2/2010 | Seshadri | G06F 21/57 726/24 |
| 2011/0179417 | A1 * | 7/2011 | Inakoshi | G06F 9/45558 718/1 |

* cited by examiner

*Primary Examiner* — William Powers

(57) ABSTRACT

A computer system mechanism is provided that restricts execution of binaries, such as applications, kernel modules, shared libraries, on the computing system to only those that have been installed by an approved mechanism. The approved mechanism acts as a single entry point on the computing for installing new binaries. Any change in file content or metadata taints an executable file and prevents execution by the kernel. Files copied over and not installed via, the approved mechanism will not be executed.

20 Claims, 3 Drawing Sheets

TRUSTED EXECUTION OF BINARIES AND MODULES

CROSS-REFERENCE TO RELATED APPLICATION(S)

This application claims the benefit of U.S. Provisional Patent Application No. 61/872,458, filed Aug. 30, 2013, the entire contents of which are incorporated by reference herein.

BACKGROUND

Vulnerability of computer systems, configurations, software, and protocols to unauthorized access or use is recognized. When vulnerabilities are discovered, exploits, which are a sequence of commands or a block of data that take advantage of vulnerabilities, are disseminated and deployed. Often, exploits seek to compromise security by introducing into a target system, data that can be interpreted by the target system in a way that facilitates the attack. One classic form of attack is the so-called buffer overflow attack, in which an exploit causes vulnerable code to write data to memory in such a way that an attacker may successfully alter an execution path of privileged code. Other exploits may modify data upon which privileged code reties. In many cases, unauthorized programs are installed, or existing programs are modified, on the compromised computer system.

SUMMARY

One or more embodiments of the present disclosure provide a method for trusted. execution of an application on a computing system having an operating system. The method includes receiving an indication to install a package having a plurality of executable files, and mounting the package at a pre-determined location in a filesystem of the computing system. The method further includes installing the plurality of executable files contained within the package in locations of an in-memory filesystem, and modifying, by execution of a kernel of the operating system, a trusted execution bit associated with each of the executable files.

Another embodiment of the present disclosure provides a computer system for trusted execution of an application. The computer system includes a system memory having an in-memory filesystem and a storage device having a persistent filesystem. The computer system further includes a processor programmed to carry out the steps of receiving an indication to install a package having a plurality of executable files, and mounting the package at a pre-determined location in the persistent filesystem of the storage device. The processor is further programmed to carry out the steps of installing the plurality of executable files contained within the package in locations of the in-memory filesystem, and modifying, by execution of a kernel of an operating system, a trusted execution bit associated with each of the executable files.

DETAILED DESCRIPTION

One or more embodiments disclosed herein provide methods, systems, and computer programs for trusted execution of executable files on a computer system. A method is described that restricts execution of binaries (e.g., applications, kernel modules, shared libraries) on a computing system to only those that have been installed by an approved mechanism. The approved mechanism acts as a single entry point on the computing for installing new binaries. Any change in file content or metadata taints an executable file and prevents execution. Files copied over and not installed as mounted installation packages (e.g., tar disks) will not be executed.

Figure 1:
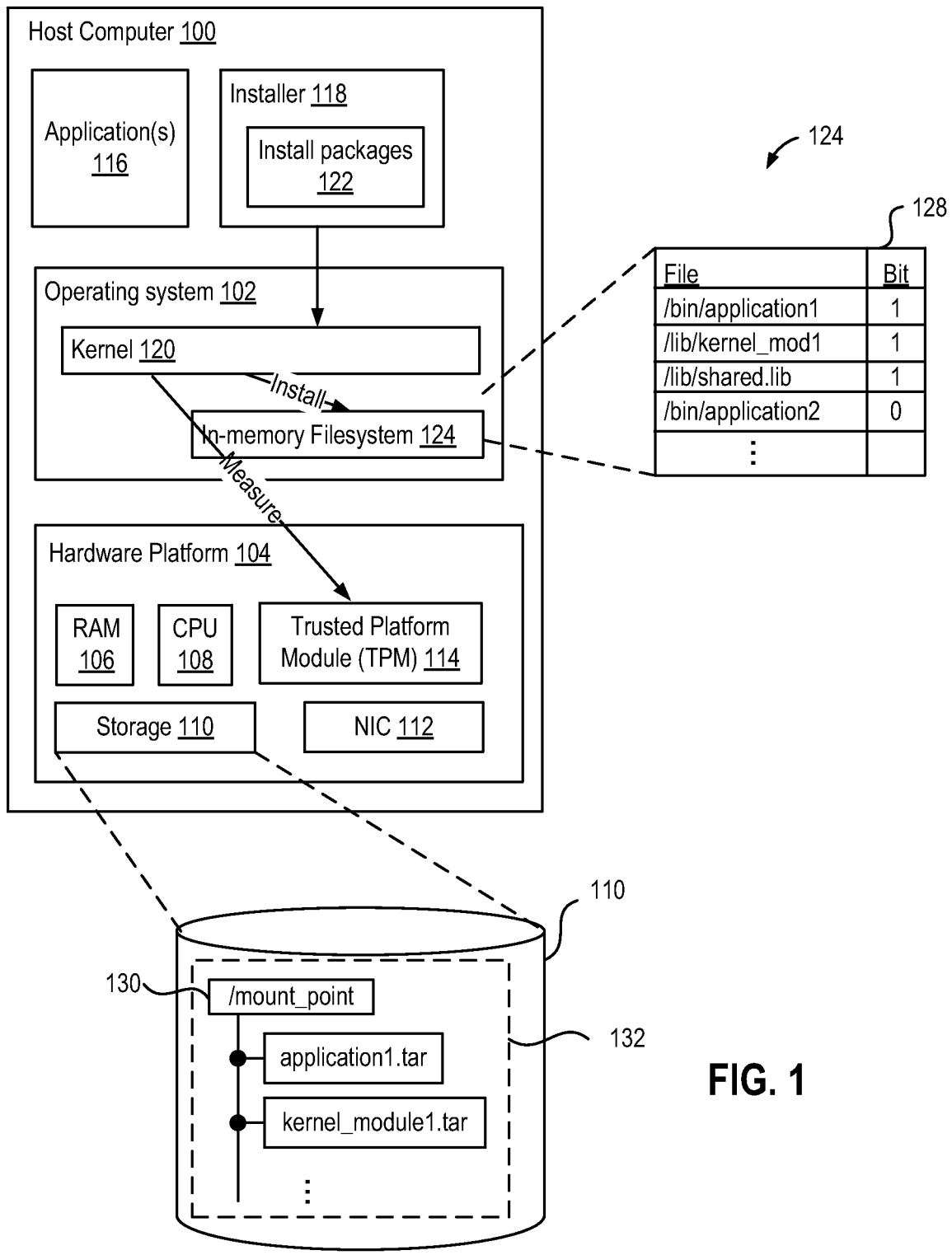
FIG. 1 is a block diagram that illustrates a computing system for trusted execution, with which one or more embodiments of the present disclosure may be utilized.

FIG. 1 is a block diagram that illustrates a host computer 100 with which one or more embodiments of the present disclosure may be utilized. As illustrated, host computer 100 includes a hardware platform 104 that may include conventional components of a computing device, such as a memory 106, a processor (CPU) 108, storage 110, and a network interface (NIC) 112. Processor 108 is configured to execute instructions, for example, executable instructions that perform one or more operations described herein and may be stored in memory 106 and in storage 110. Memory 106 and storage 110 are devices allowing information, such as executable instructions, cryptographic keys, virtual disks, configurations, and other data, to be stored and retrieved. Memory 106 may include, for example, one or more random access memory (RAM) modules. Storage 110 may include local storage, for example, one or more hard disks, flash memory modules, solid state disks, and optical disks, and may also a disk interface that enables host 100 to communicate with one or more network data storage systems. Examples of a disk interface are a host bus adapter (HBA) that couples host 100 to a storage area network (SAN) or a network file system interface. Network interface 112 enables host 100 to communicate with another device via a communication medium or network. An example of network interface 112 is a network adapter, also referred to as a Network Interface Card (NIC).

In one embodiment, hardware platform 104 includes a Trusted Platform Module 114 (TPM) to verify the identity of a host computer 100 and to verify the authenticity of one or more applications 116 executing thereon. A Trusted Platform Module offers facilities for the secure generation of cryptographic keys, and limitation of their use. In one implementation, TPM 114 may use, or be part of, a hardware-based security technology such as Intel Trusted Execution Technology (TXT) made commercially available by Intel Corporation. TPM 114 may include special registers (e.g., Platform Configuration Registers, or PCRs) which hold various "measurements," which can be made of code, data structures, configurations, information, and other data on host computer 100. Measurements, i.e., PCR values, can be provided locally and remotely. TPM 114 may digitally sign PCR values to provide "remote attestation" that verifies to any entity that the measurements come from and are protected by TPM 114.

Host computer 100 includes an operating system 102 and one or more applications 116 running on top of operating system 102. Operating system 102 may include a plurality of software layers, such as a kernel 120 that manages hardware resources provided by hardware platform 104 through various drivers. In some embodiments, operating system 102 may be any operating system that is commercially available (e.g., Microsoft Windows, Linux). in another embodiment, operating system 102 may be, or may include as a component, a hypervisor that supports virtual machine applications running thereon, such as a VMware ESXi® hypervisor provided as part of the VMware vSphere® product made commercially available from VMware, Inc. of Palo Alto, Calif. Another example of an operating system 102 may be VMkernel, which is a POSIX-like operating system made commercially available by VMware, Inc., which provides functionality found in traditional operating systems, such as process creation and control, signals, file system, and process threads, and is designed specifically to support running multiple virtual machines.

In one embodiment, operating system 102 and kernel 120 manage storage resources of storage 110 using a persistent filesystem 132 used to store a set of files within storage 110. One example of a filesystem may be Virtual Machine File System (VMFS), made commercially available by VMware, Inc., which can be used to support virtualization and store virtual machine disk images.

In one embodiment, kernel 120 may further include an in-memory filesystem 124 to hold configuration files (e.g., hypervisor configurations files), log files, staged patches, and installed files. In-memory filesystem 124 may have a structure similar to filesystem 132, for example, having file directories /var/log/, /tmp/, /etc/, etc. Kernel 120 may generate in-memory filesystem 124 at boot time, and load contents into in-memory filesystem 124 from approved boot images located within certain protected partitions of memory (sometimes referred to as a boot bank) or other pre-determined locations (such as mounted install packages, described later).

One type of application 116 executing on operating system 102 may be an installer 118 configured to install applications on host computer 100 using one or more install packages 122. Install packages 122 may be packaged in one or more files in a variety of formats or configurations, including archive formats (e.g., tar balls, zip files), package formats RPMs, or Red Hat Package Manager format), and disk images (e.g., ISO images). Install packages 122 may contain a plurality of files, including executable binaries, pre-compiled code, library files, configuration files, and other application data. Install packages 122 may include an installation file that specifies how the application should be installed, such as destination paths within a target filesystem for each file (e.g., in /usr, in /lib, etc.).

In operation, a user, such as a system administrator, may run installer 118, and based on interactions with a user interface, including command line interface (CLI) Or graphical user interface (GUI), install an application contained within install packages 122 onto host computer 100. In one embodiment, installer 118 is configured to install applications on host 100 using an approved mechanism provided by operating system 102 for trusted execution of binaries, modules, shared libraries, drivers, and other software components. In one embodiment, installer 118 invokes a system call of operating system 102 and passes install packages 122 as parameters to the system call.

In one embodiment, kernel 120 is configured to provide a single entry point, such as a system call, into kernel 120 by which to mount install packages 122 (e.g., tar files) and "install" files within install package 122 into in-memory filesystem 124. As shown in FIG. 1, kernel 120 may have a predetermined location within persistent filesystem 132, depicted as mount point 130, for mounting install packages 122. In another embodiment, mount point 130 for install packages 122 may be part of in-memory filesystem 124. Each file that is "installed" is tracked in kernel 120 for any modification or changes. In one embodiment, kernel 120 tags each file installed within in-memory filesystem 124 with a special trusted execution bit 128 that indicates that the corresponding file has been installed using the approved mechanism and further that the corresponding file is unchanged since installation. As shown in FIG. 1, kernel 120 installs executable code or binaries (e.g., application1), kernel modules (e.g., kernel_module1), shared libraries (e.g., shared.lib), and other types of files that kernel 120 may be configured to protect from untrusted execution into in-memory filesystem 124. Kernel 120 installs the binaries, kernel module, shared libraries, and other files in locations within in-memory filesystem 124 that corresponds to locations within persistent filesystem 132 that would otherwise be the destinations if using conventional techniques for installing packages. For example, the binary "application1" is installed within the bin directory, and the kernel module "kernel_module1" and shared library "shared.lib" are installed within the /lib/ directory of in-memory filesystem 124 (instead of persistent filesystem 132). It is recognized that system software such as kernel 120 and pre-installed components of operating system 102 may be pre-loaded into in-memory filesystem 124 upon loading of operating system 102 during boot.

In one embodiment, kernel 120 is configured to detect any change to files tracked within in-memory filesystem 124 and invalidates a corresponding trusted execution bit 128. Any changes to a file may include changes to the data content of the file itself or changes to metadata of the (e.g., permissions, filename, etc.). In some embodiments, kernel 120 is configured to intercept write requests to one or more files within in-memory filesystem 124 and invalidate trusted execution bit 128 associated with the files targeted by the write requests. The invalidated trusted execution bit 128 may be set to a value such as zero, logical false, or another suitable value. During execution of an application (or kernel module, shared library, etc.), kernel 120 is configured to execute an application only if the application has a valid trusted execution bit 128. It should be recognized that any new files copied to the filesystem in storage 110 using other means, such as a copy over network via INIC 112 or copy from other devices, would not have the special trusted execution bit 128 set. For example, as shown in FIG. 1, kernel 120 may decline to execute an executable binary (e.g., application2) that has an invalidated trusted execution bit 128 (e.g., having a 0 value) that indicates the file has not been installed on the system and thus does not have the bit set, or indicates that the file was installed but has been modified since installation. In one embodiment, kernel 120 is configured to disallow the modification of an executable (or other files) while the executable is running and its corresponding trusted execution bit 128 is set. Accordingly, kernel 120 provides a secure mechanism to enforce execution of only those files that have been installed via the approved mechanism.

According to one embodiment, kernel 120 is configured to measure (i.e., hash) the entire install package 122, or one or more files within install package 122, and store the results within one or more registers of TPM 114 using known TPM reporting mechanisms. TPM 114 may thereby provide a guarantee that no unmeasured file can be executed on host computer 100.

Figure 2:
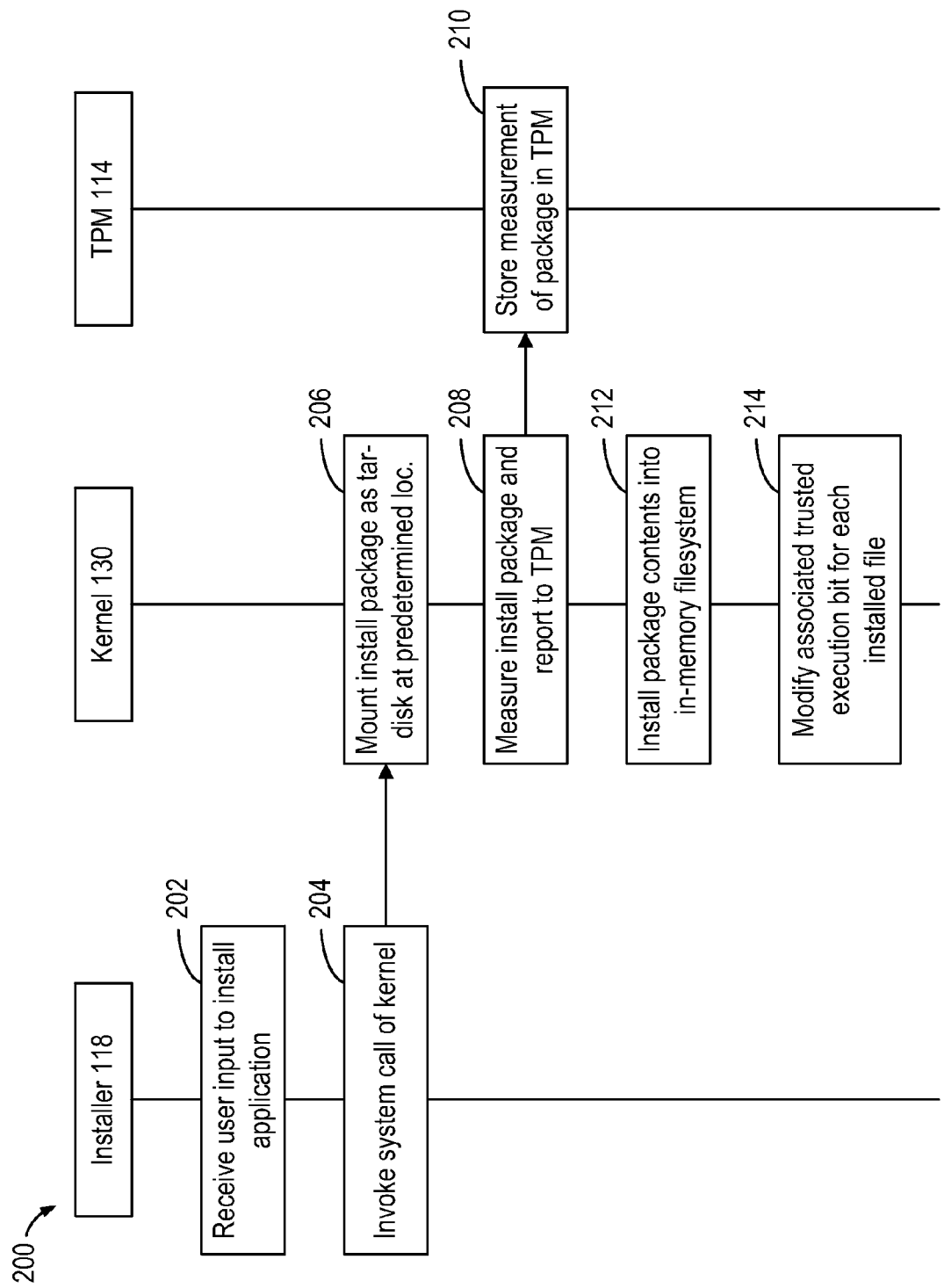
FIG. 2 is a flow diagram that illustrates steps for a method for installing a file for trusted execution on a computer device, according to an embodiment of the present disclosure.

FIG. 2 is a flow diagram that illustrates steps for a method 200 for installing a file for trusted execution on a computer device, according to an embodiment of the present disclosure. At step 202, installer 118 receives, via user input, an indication to install an application, file, or other software component contained in one or more install packages 122.

At step 204, responsive to receiving the indication, installer 118 invokes a system call of kernel 120 to mount and install the install packages. In some embodiments, installer 118 may invoke a dedicated "INSTALL" system call that moves or copies install package 122 to the predetermined location within storage 110, e.g., a folder, directory, or mount point 130, which triggers the trusted installation mechanism described herein. In other embodiments, installer 118 may use a traditional "MOVE" system call specifying mount point 130 as a destination, and kernel 120 detects when new install packages have been added to mount point 130 and initiates the trusted installation mechanism described herein.

At step 206, responsive to the system call invocation, kernel 120 mounts install package 122 (e.g., as a "tar disk") at the predetermined location within storage 110, i.e., mount point 130. In some embodiments, install packages 122 within mount point 130 may be installed upon next reboot or boot time, rather than immediately. In such embodiments, upon booting, kernel 120 checks mount point 130 for any (new) install packages and performs the procedures described below.

At step 208, kernel 120 takes a measurement of install package 122 by generating a hash-key summary of install package 122 based on contents of install package 122 and further based on hardware platform 104, BIOS code of hardware platform 104, keys contained within TPM 114, and other information, according to known techniques for making measurements. Kernel 120 reports the measurement to TPM 114. At step 210, TPM 114 receives and stores the measurement associated with installed package 122 into one or more registers (e.g., PCRs) of TPM. 114.

At step 212, kernel 120 installs contents of install package 1122 into in-memory filesystem 124 of host computer 100. Kernel 120 may distribute copies of the files contained in install package 122 throughout in-memory filesystem 124. In some embodiments, kernel 120 installs each file contained in the mounted install package 122 to various locations within in memory filesystem 124 according to the installation file within, install package 122 that specifies the destination path for each file contained in install package 122. At step 214, for each file installed, kernel 120 sets the associated trusted execution bit 128 to a "valid" value (e.g., true, non-zero, 1) to indicate the installed file has been installed by kernel 1120 using the approved mechanism.

Figure 3:
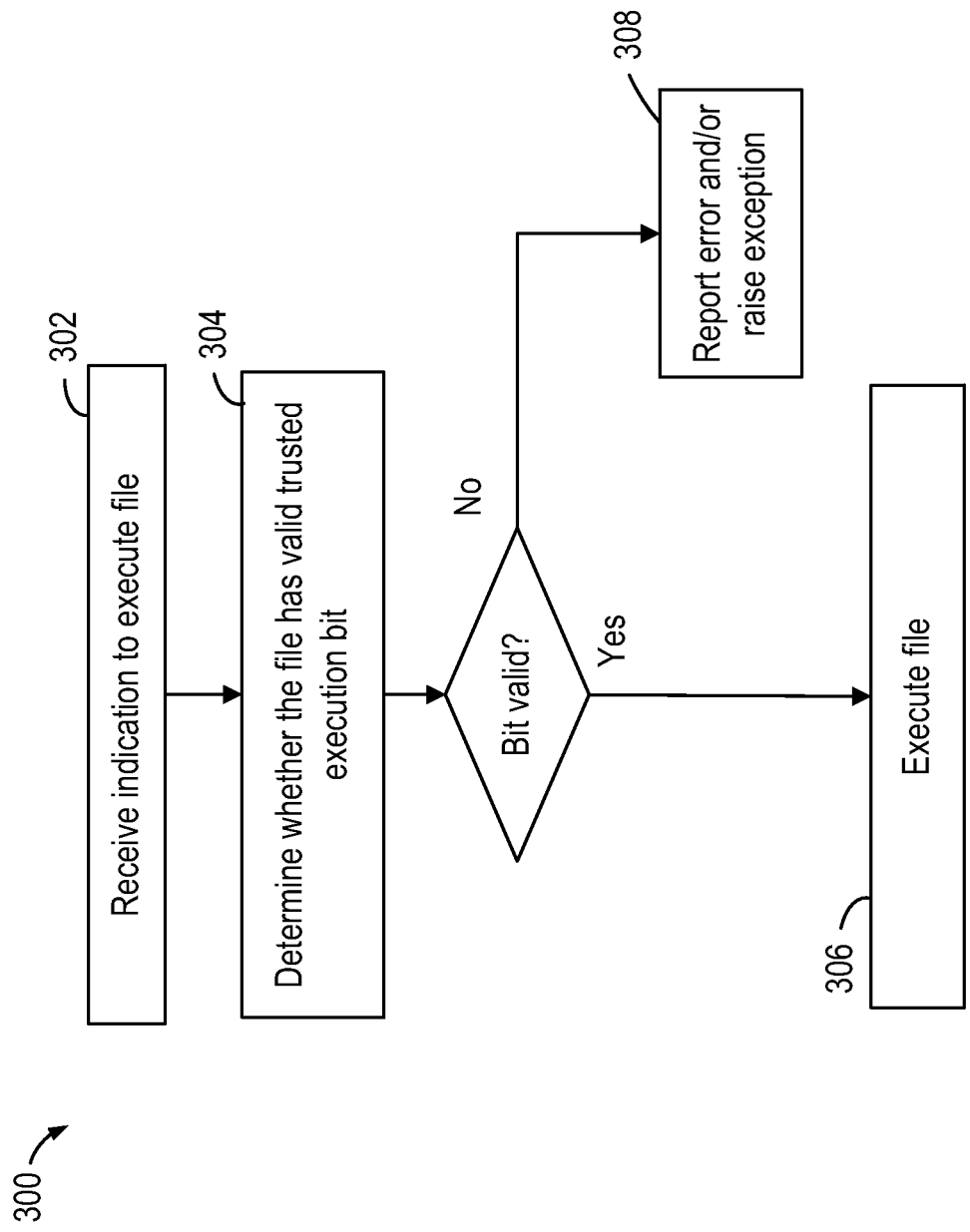
FIG. 3 is a flow diagram that illustrates steps for a method for trusted execution on a computer device, according to an embodiment of the present disclosure

FIG. 3 is a flow diagram that illustrates steps for a method 300 for trusted execution on a computer device, according to an embodiment of the present disclosure. At step 302, kernel 120 receives an indication to execute a target file within host computer 100. In some embodiments, the file to be executed may be an executable binary, kernel module, shared library, or other file within host computer 100.

At step 304, kernel 120 determines whether the file to be executed has a valid trusted execution bit 128. If trusted execution bit 128 associated with the requested file is still valid, at step 306, kernel 120 executes the requested file. In some embodiments, a third party entity may query TPM 114 to retrieve PCR values associated with the requested file and verify the integrity of the file.

Responsive to determining the file to be executed has an invalidated trusted execution bit 128, at step 308, kernel 12.0 declines to execute the requested file. In some embodiments, kernel 120 may report an error, raise an exception, and performs other forms of error handling. Accordingly, kernel 120 does not execute executable files introduced into host computer 100 through means other than the approved mechanism described in conjunction with FIG. 2. It should be recognized that executable files copied over a network into storage 110 or copied over from another device would not have an associated trusted execution bit 128 set by the kernel and therefore would not receive approval to execute on host computer 100. Further, kernel 120 does not execute executable files that may have been introduced into host computer 100 through the approved mechanism, but have been modified since the time of installation. As such, kernel 120 prevents execution of once-trusted files that may have been accidentally modified by a system administrator, thereby preventing inconsistent state or other runtime errors within host computer 100. In another example, kernel 120 prevents execution of once-trusted files that may have maliciously modified by a third party, thereby providing a layer of security and protection to host computer 100.

In one embodiment, kernel 120 may also prevent modification of an executable while the executable is running, and the corresponding trusted execution bit is set. Responsive to receiving a request to change a file (e.g., executable binary) having an associated trusted execution bit 128 that is valid, kernel 120 may disallow the request to change the file during execution of that file.

Accordingly, embodiment of the present disclosure provide a single entry point by which kernel can centrally manage and check for trusted execution of executable files. Known techniques for managing a computer system use a traditional persistent filesystem where an administrator could tamper with the filesystem metadata between reboots by running some other OS that will allow such a manipulation. In contrast, using embodiments of the present disclosure, all installed files come from a tar file (which by itself could be on a persistent filesystem 132 like VMFS or NFS). However, upon installation the installed files become part of in-memory filesystem 124. This also illustrates the point that on every boot all the files are installed "again" since the in-memory filesystem 124 is being re-generated.

While known techniques for trusted execution might use digital signatures on every binary, such techniques only work if the public keys used to verify the digital signatures are protected from tampering. Further, these public keys are generally under the control of a system administrator, and therefore may be circumvented by an administrator installing a different public key onto the system. Furthermore, embodiments of the present disclosure provide a mechanism for trusted execution that has little to no additional runtime overhead, i.e., the kernel only needs to check one metadata bit per file executed.

Although one or more embodiments of the present disclosure have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

The various embodiments described herein may employ various computer-implemented operations involving data stored in computer systems. For example, these operations may require physical manipulation of physical quantities which usually, though not necessarily, take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments of the disclosure may be useful machine operations. In addition, one or more embodiments of the disclosure also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the description provided herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like. One or more embodiments of the present disclosure may be implemented as one or more computer programs or as one or more computer program modules embodied in one or more computer readable media. The term computer readable medium refers to any data storage device that can store data which can thereafter be input to a computer system; computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD-ROM (Compact Disc-ROM), a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

We claim:

1. A method for trusted execution of an application on a computing system having an operating system, the method comprising:
    receiving an indication to install a package comprising a plurality of executable files;
    mounting the package at a pre-determined location in a filesystem of the computing system;
    installing the plurality of executable files contained within the package in locations of an in-memory filesystem; and
    modifying, by execution of a kernel of the operating system, a trusted execution bit associated with each of the executable files.

2. The method of claim 1, further comprising:
    generating a measurement based on the package of files using a trusted platform module.

3. The method of claim I, further comprising:
    responsive to receiving an indication to execute a target file, determining whether the target file has an associated trusted execution bit that is valid; and
    executing the target file having the associated trusted execution bit that is valid.

4. The method of claim 3, further comprising:
    responsive to determining the target file does not have a valid associated trusted execution bit, declining to execute the target file.

5. The method of claim 3, further comprising:
    responsive to receiving a request to change the target file having the associated trusted execution bit that is valid, disallowing the request to change the target file during execution of the target file.

6. The method of claim 1, further comprising:
    responsive detecting a change to a file within the in-memory filesystem having an associated trusted execution bit, invalidating the trusted execution bit associated with the changed file.

7. The method of claim 1, wherein the plurality of executable files are installed in the locations of the in-memory filesystem corresponding to locations in the filesystem of the computing system.

8. A non-transitory computer-readable storage medium comprising instructions that, when executed in a computing device, provide trusted execution of an application on a computing system having an operating system, by performing the steps of:
    receiving an indication to install a package comprising a plurality of executable files;
    mounting the package at a pre-determined location in a filesystem of the computing system;
    installing the plurality of executable files contained within the package in locations of an in-memory filesystem; and
    modifying, by execution of a kernel of the operating system, a trusted execution bit associated with each of the executable files.

9. The non-transitory computer-readable storage medium of claim 8, wherein the steps further comprise:
    generating a measurement based on the package of files using a trusted platform module.

10. The non-transitory computer-readable storage medium of claim 8, wherein the steps further comprise:
    responsive to receiving an indication to execute a target file, determining whether the target file has an associated trusted execution bit that is valid; and
    executing the target file having the associated trusted execution bit that is valid.

11. The non-transitory computer-readable storage medium of claim 10, wherein the steps further comprise:
    responsive to determining the target file does not have a valid associated trusted execution bit, declining to execute the target file.

12. The non-transitory computer-readable storage medium of claim 10, wherein the steps further comprise:
    responsive to receiving a request to change the target file having the associated trusted execution bit that is valid, disallowing the request to change the target file during execution of the target file.

13. The non-transitory computer-readable storage medium of claim 8, wherein the steps further comprise:
    responsive detecting a change to a file within the in-memory filesystem having an associated trusted execution bit, invalidating the trusted execution bit associated with the changed file.

14. The non-transitory computer-readable storage medium of claim 8, wherein the plurality of executable files are installed in the locations of the in-memory filesystem corresponding to locations in the filesystem of the computing system.

15. A computer system for trusted execution of an application, the computer system comprising:
   a system memory comprising an in-memory filesystem;
   a storage device comprising a persistent filesystem;
   a processor programmed to carry out the steps of:
      receiving an indication to install a package comprising a plurality of executable files;
      mounting the package at a pre-determined location in the persistent filesystem of the storage device;
      installing the plurality of executable files contained within the package in locations of the in-memory filesystem; and
      modifying, by execution of a kernel of an operating system, a trusted execution bit associated with each of the executable files.

16. The computer system of claim 15, further comprising a trusted platform module;
   wherein the processor is further programmed to carry out the steps of generating a measurement based on the package of files using the trusted platform module.

17. The computer system of claim 15, wherein the processor is further programmed to carry out the steps of:
   responsive to receiving an indication to execute a target file, determining whether the target file has an associated trusted execution bit that is valid; and
   executing the target file having the associated trusted execution bit that is valid.

18. The computer system of claim 17, wherein the processor is further programmed to carry out the steps of:
   responsive to determining the target file does not have a valid associated trusted execution bit, declining to execute the target file.

19. The computer system of claim 17, wherein the processor is further programmed to carry out the steps of:
   responsive to receiving a request to change the target file having the associated trusted execution bit that is valid, disallowing the request to change the target file during execution of the target file.

20. The computer system of claim 15, wherein the processor is further programmed to carry out the steps of:
   responsive detecting a change to a file within the in-memory filesystem having an associated trusted execution bit, invalidating the trusted execution bit associated with the changed file.

* * * * *